(12) United States Patent
Koneru et al.

(10) Patent No.: US 9,405,723 B2
(45) Date of Patent: Aug. 2, 2016

(54) MOBILE APPLICATION MANAGEMENT SYSTEMS AND METHODS THEREOF

(75) Inventors: Raj Kumar Koneru, Windermere, FL (US); Pattabhi Rama Rao Dasari, Hyderabad (IN); Prajakt Deshpande, Hyderabad (IN); Vivek Iyer, Hyderabad (IN); Rajendra Komandur, Hyderabad (IN); Aravind Perumal, Hyderabad (IN); Sriram Ramanathan, Lutz, FL (US); Matthew Terry, Celebration, FL (US); Vamsi Krishna Vagvala, Hyderabad (IN); Sathyanarayana Vennapusala, Hyderabad (IN)

(73) Assignee: KONY, INC., Orlando, FL (US)

( * ) Notice: Subject to any disclaimer, the term of this patent is extended or adjusted under 35 U.S.C. 154(b) by 306 days.

(21) Appl. No.: 13/462,354

(22) Filed: May 2, 2012

(65) Prior Publication Data

US 2013/0298185 A1    Nov. 7, 2013

(51) Int. Cl.
*G06F 15/173* (2006.01)
*G06F 21/00* (2013.01)
*G06F 21/53* (2013.01)

(52) U.S. Cl.
CPC .............. *G06F 15/173* (2013.01); *G06F 21/00* (2013.01); *G06F 21/53* (2013.01)

(58) Field of Classification Search
CPC ....... G06F 21/50; G06F 15/173; G06F 21/53; G06F 21/00; H04L 63/20
USPC ............................................... 726/1; 709/223
See application file for complete search history.

(56) References Cited

U.S. PATENT DOCUMENTS

| | | | | |
|---|---|---|---|---|
| 5,629,980 | A * | 5/1997 | Stefik et al. ............... | 705/54 |
| 7,380,267 | B2 * | 5/2008 | Arai ............... | G06F 21/604 726/1 |
| 7,448,022 | B1 * | 11/2008 | Ram ............... | G06F 8/00 717/120 |
| 7,730,138 | B2 * | 6/2010 | Ballinger ............... | H04L 67/16 709/206 |
| 8,255,991 | B1 * | 8/2012 | Hackborn et al. ............... | 726/21 |
| 8,332,936 | B1 * | 12/2012 | Hackborn et al. ............... | 726/21 |
| 8,458,765 | B2 * | 6/2013 | Aciicmez et al. ............... | 726/1 |
| 8,578,443 | B2 * | 11/2013 | Narain et al. ............... | 726/1 |
| 2003/0079133 | A1 * | 4/2003 | Breiter et al. ............... | 713/182 |
| 2003/0084324 | A1 * | 5/2003 | Koved ............... | G06F 21/53 726/6 |
| 2003/0084325 | A1 * | 5/2003 | Koved ............... | G06F 21/53 726/6 |
| 2004/0193606 | A1 * | 9/2004 | Arai ............... | G06F 21/6218 |

(Continued)

OTHER PUBLICATIONS

Cox, John, New Apple iOS 4 APIs expand iPhone device management, networkworld.com, Jun. 21, 2010.*

(Continued)

*Primary Examiner* — Joseph P Hirl
*Assistant Examiner* — J. Brant Murphy
(74) *Attorney, Agent, or Firm* — Andrew M. Calderon

(57) ABSTRACT

A mobile application management through policy inclusion using centralized enforcement libraries is disclosed. The method includes storing independently developed mobile applications on at least one server. The method further includes storing independently developed policies associated with each of the independently developed mobile applications on the at least one server. The method further includes associating a policy of the stored independently developed policies with any of the mobile applications of the independently developed mobile applications. The method further includes providing the associated policy and mobile application to a mobile device where the enforcement libraries restrict the app as instructed by the policy.

25 Claims, 5 Drawing Sheets

(56) References Cited

U.S. PATENT DOCUMENTS

| | | | |
|---|---|---|---|
| 2004/0193917 A1* | 9/2004 | Drews | 713/201 |
| 2005/0039158 A1* | 2/2005 | Koved | G06F 21/53 717/100 |
| 2006/0242685 A1* | 10/2006 | Heard | G06F 21/577 726/3 |
| 2007/0288989 A1* | 12/2007 | Aarnos et al. | 726/1 |
| 2008/0086614 A1* | 4/2008 | Canis et al. | 711/163 |
| 2008/0288412 A1* | 11/2008 | Treffers et al. | 705/52 |
| 2009/0049518 A1* | 2/2009 | Roman et al. | 726/1 |
| 2009/0165078 A1* | 6/2009 | Samudrala et al. | 726/1 |
| 2009/0210868 A1* | 8/2009 | Parthasarathy | 717/169 |
| 2009/0280795 A1* | 11/2009 | O'Shaughnessy | H04M 3/42136 455/419 |
| 2009/0300706 A1* | 12/2009 | Ray et al. | 726/1 |
| 2009/0300707 A1* | 12/2009 | Garimella et al. | 726/1 |
| 2009/0313004 A1* | 12/2009 | Levi et al. | 703/28 |
| 2010/0064341 A1* | 3/2010 | Aldera | 726/1 |
| 2010/0251340 A1* | 9/2010 | Martin et al. | 726/4 |
| 2011/0082900 A1* | 4/2011 | Nagpal et al. | 709/203 |
| 2011/0289554 A1* | 11/2011 | Kahandaliyanage | 726/1 |
| 2012/0066287 A1* | 3/2012 | Hajost | 709/203 |
| 2012/0129503 A1* | 5/2012 | Lindeman et al. | 455/414.1 |
| 2012/0167162 A1* | 6/2012 | Raleigh et al. | 726/1 |
| 2012/0210443 A1* | 8/2012 | Blaisdell et al. | 726/27 |
| 2012/0215911 A1* | 8/2012 | Raleigh et al. | 709/224 |
| 2012/0216292 A1* | 8/2012 | Richardson et al. | 726/27 |
| 2012/0221955 A1* | 8/2012 | Raleigh et al. | 715/736 |
| 2012/0246484 A1* | 9/2012 | Blaisdell et al. | 713/189 |
| 2012/0246731 A1* | 9/2012 | Blaisdell et al. | 726/26 |
| 2012/0254825 A1* | 10/2012 | Sharma et al. | 717/101 |
| 2012/0303490 A1* | 11/2012 | Hill et al. | 705/27.2 |
| 2013/0166899 A1* | 6/2013 | Courtney et al. | 713/100 |
| 2013/0268667 A1* | 10/2013 | Abuelsaad et al. | 709/225 |
| 2013/0283298 A1* | 10/2013 | Ali et al. | 719/319 |
| 2013/0290709 A1* | 10/2013 | Muppidi et al. | 713/168 |
| 2013/0298185 A1* | 11/2013 | Koneru et al. | 726/1 |

OTHER PUBLICATIONS

U.S. Appl. No. 61/492,205, filed Jun. 1, 2011, Narain, et al.*
Good Dynamics "Technical Overview", 9 pages, downloaded May 2, 2012 from http://www.good.com/media/pdf/good-dynamics/gd_technical_overview.pdf.
Good Dynamics "Key Considerations . . . Applications", 7 pages, downloaded May 2, 2012 from http://www.good.com/media/pdf/good-dynamics/good_dynamics_wp.pdf.
Good Dynamics "Security White Paper", 12 pages, downloaded May 2, 2012 from http://www.good.com/media/pdf/good-dynamics/gd_security_wp.pdf.

* cited by examiner

MOBILE APPLICATION MANAGEMENT SYSTEMS AND METHODS THEREOF

FIELD OF THE INVENTION

The invention relates to mobile application management systems and methods thereof and, more particularly, to mobile application management through policy inclusion using centralized enforcement libraries.

BACKGROUND OF THE INVENTION

The adoption of "smart" phone use in the enterprise has lagged behind the productivity gains seen in the consumer market due in part to concerns on how to securely offer mobile applications to employees. When companies do offer mobile access to corporate systems, it is typically only allowed from a limited set of devices and through a restrictive device configuration ensuring data security. These device restrictions adversely impact the functionality of the device for personal use and have slowed adoption of the mobile device as a prominent productivity tool for the enterprise.

For example, Mobile Device Management (MDM) refers to the infrastructure that manages a mobile device so that enterprises can manage the devices that they have purchased and issued to their employees. In this scenario, given the device is owned by the enterprise, the enterprise is entitled to have total control over the device and in this regard, there are a number of companies that offer technology and solutions for mobile device management. However, these technologies are cumbersome, require centralized systems and restrict usage on the device level.

There is also a new trend emerging called bring your own device (BYOD), that is penetrating the marketplace. BYOD reflects a scenario where the employee brings his or her own device with their own personal data into the workplace. In this scenario, the employee wants to have certain work related applications loaded onto the device while maintaining their private applications simultaneously on the device. In this respect, employees are very concerned about the employer deploying a comprehensive device management client onto the device that essentially hijacks the device and potentially violates their privacy given that mobile devices are ubiquitous and attributes like location and presence can be tracked. There is therefore a strong need for an application based policy management system that is differentiated from mobile device management (MDM) systems, which is fairly common these days.

Accordingly, there exists a need in the art to overcome the deficiencies and limitations described hereinabove.

SUMMARY OF THE INVENTION

In a first aspect of the invention, a method comprises storing independently developed mobile applications on at least one server. The method further comprises storing independently developed policies associated with each of the independently developed mobile applications on the at least one server. The method further comprises associating a policy of the stored independently developed policies with any of the mobile applications of the independently developed mobile applications. The method further comprises providing the associated policy and mobile application to a mobile device.

In another aspect of the invention, a system implements policies on a mobile device and associated with at least one mobile application. The system comprises a mobile application management server, comprising: a portal for receiving independently developed mobile applications and one or more policies; a repository for storing the independently developed mobile applications; a repository for storing the one or more policies associated with any of the independently developed mobile applications; and a service component to provide a default policy of the stored policies and an associated mobile application of the mobile applications to a mobile device.

In yet another aspect of the invention, a computer system for sending and receiving policies and mobile applications. The system comprises a CPU, a computer readable memory and a computer readable storage media. The computer system further comprises: first program instructions to retrieve independently developed mobile applications from a repository; second program instructions to retrieve independently developed one or more policies from a repository; and third program instructions to provide a package comprising a default policy of the one or more policies and a mobile application to be independently executed on a mobile device. The first, second and third program instructions are stored on the computer readable storage media for execution by the CPU via the computer readable memory.

In still another aspect of the invention, a method comprises receiving a mobile application and a policy associated with the mobile application. The method further comprises executing the policy through an application program interface (API) of an operating system of the mobile application, prior to the mobile application. The policy is retrieved from a reusable library of application policy enforcements that are combined with any enterprise mobile application. The policy provides a security layer between the mobile application and an operating system of the mobile device. The policy runs independent of the mobile application. The policy runs through the operating system of the mobile device, prior to the mobile application, to apply enforcement rules for the mobile application.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
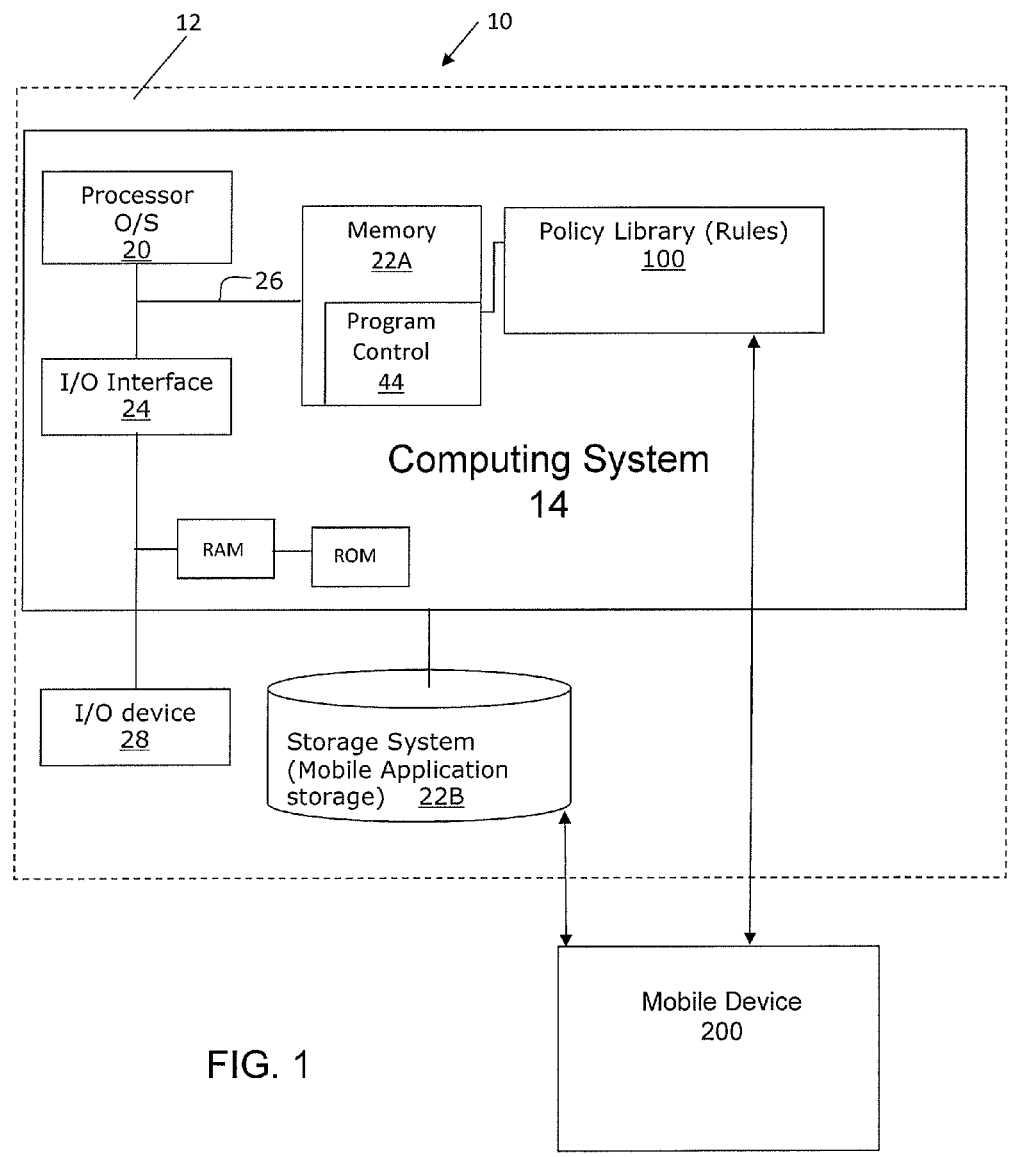
FIG. 1 an illustrative environment for implementing the processes in accordance with aspects of the invention.

The invention relates to mobile application management systems and methods thereof and, more particularly, to mobile application management through policy inclusion using centralized enforcement libraries. More specifically, the present invention shifts the protection and security paradigm of an enterprise system from device restriction to specific mobile application restriction. Thus, the present invention provides mobile application management (MAM) policies, as a solution to enterprise security concerns. As such, the MAM policies enable management of each mobile application distributed by the enterprise; instead of managing the device, itself.

In implementation, the MAM policies include a reusable library of application policy enforcements that can be combined with any enterprise mobile application. The MAM policies can be configurable based on many different criteria such as, for example, type of mobile application, type of mobile device, user status, or any combinations thereof. This enables each enterprise mobile application to be managed and secured using the same method of configuring a policy that defines any data or runtime restrictions. In embodiments, the libraries are transparent allowing the developer to write code without any knowledge that the security libraries will be used to enforce policies. Since these libraries are transparent to the developer, they can be applied to applications after they are compiled, if needed. This can be done by simply adding code to the mobile application, requiring policies to be enforced at application runtime.

In embodiments, the policy libraries do not require the developer to learn or utilize custom APIs. Instead, by implementing the present invention, the mobile application can continue to use the full set of existing standard APIs of a current operating system and/or networking environment. In this way, the policy libraries simply act as a security layer between the application runtime code and the operating system of the mobile device. It should be understood, though, that custom APIs can also be implemented by the present invention, but they are not required.

Also, another feature of the present invention is that it operates completely disconnected from any supporting system infrastructure once the application is distributed to the end user. For example, the present invention provides a policy enforcement application layer that is native to the mobile application and/or mobile device, itself, and which includes a default policy instructing its behavior. Accordingly, there is no secure gateway or policy server required to utilize the mobile application. Thus, the present invention does not require the application to run through a network operations center (NOC) server for enforcement and secure data transmissions. In fact, the present invention does not require any external network infrastructure to enable the solution, once it is installed or updated on the mobile device. Instead, the policy file, i.e., preferably the most recently updated policy file, is kept locally on the mobile device, which is enforced with any runtime rules; that is, the policy is kept locally on the mobile device, for example, and will run through the operating system of the mobile device without the need for any external, remote server resources or custom application program interfaces (API).

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in the medium. The computer-usable or computer-readable medium may be any medium that can contain, store, communicate, or transport the program for use by or in connection with an instruction execution system, apparatus, or device. The computer-usable or computer-readable medium may be, for example, an electronic, magnetic, optical, electromagnetic, infrared, or semiconductor system, apparatus, or device.

FIG. 1 shows an illustrative environment 10 for managing the processes in accordance with the invention. The environment 10 includes a server or other computing system 12. The server 12 can be any server which is implementing or hosting, for example, an application store, on an enterprise system, i.e., a mobile application management server. For example, the server 12 can be a host server for any business enterprise, which stores enterprise mobile applications in a storage system 22b, for future downloading by an employee or business partner, e.g., consultant, independent contractor, etc. In embodiments, the server 12 can be a standalone server, which implements the processes of the present invention within a networking environment. That is, the server 12 and/or processes performed by the server 12 can be integrated into the networking environment of any enterprise.

The mobile application management server 12 includes a computing device 14 which can be resident on a network infrastructure or computing device. The computing device 14 includes a processor 20, memory 22A, an I/O interface 24, and a bus 26. The bus 26 provides a communications link between each of the components in the computing device 14. In addition, the computing device includes random access memory (RAM), a read-only memory (ROM), and an operating system (O/S). The computing device 14 is in communication with the external I/O device/resource 28 and a storage system 22B. The I/O device 28 can comprise any device that enables an individual to interact with the computing device 14 (e.g., user interface) or any device that enables the computing device 14 to communicate with one or more other computing devices using any type of communications link. The storage system 22B can store any number of mobile applications, which are independently developed by one or more developers, and which can be maintained, for example, by an enterprise administrator.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code can include computer program instructions which are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

The computer readable storage medium may be, for example an electronic, magnetic, optical, electromagnetic, infrared, and/or semiconductor system. More specific examples (a non-exhaustive list) would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain, or store a program for use by or in connection with an instruction execution system, apparatus, or device of the present invention.

In embodiments, the program code can obtain policies (rules) from a policy library 100 which, e.g., implements the processes described herein. The policy library 100 can be a storage system, or implemented as one or more program code in the program control 44 stored in memory 22A as separate or combined modules. Additionally, the policy library 100 may be implemented as separate dedicated processors or a single or several processors to provide the function of these tools.

In embodiments, policies from the policy library 100 can be provided to a mobile device 200, in addition to being applied and/or associated with the mobile applications stored in the storage system 22B. In embodiments, the policies of the policy library 100 can be packaged with any of the mobile applications, either in the computing system 12 or the mobile device 200. For example, prior to downloading of the mobile application from the storage system 22B, a default policy can be appended (packaged) to the mobile application, and both can be downloaded to the mobile device 200 at the same time as separate or combined components. In embodiments, the mobile application can be packaged with a default policy or, alternatively, can be a specific policy based on many different factors, as described herein. In either approach, once the mobile application and policy are installed on the mobile device 200, the policy remains local on the mobile device, for execution though the APIs of the operating system of the mobile device, and can be updated by the mobile device, either through a pull or push mechanism. Also, the policies act as a security layer between the application runtime code and the operating system of the mobile device.

It should be understood by those of ordinary skill in the art that any number of policies can be appended or packaged to the mobile application, depending on many factors. That is, the policies can be targeted on a much more granular level than just the specific mobile application. For example, a different policy can be configured taking into account the application ID, device platform (e.g., such as iOS, Android,® Blackberry®, Windows® Mobile™, etc.), specific DeviceID, specific userid, device characteristics and/or the user's group information. Also, certain levels of security or enforcement policies can be matched to a mobile application based on the user, e.g., level of security, types of applications, types of mobile devices, etc.

The policy can be an XML file or other type of file that contains the restrictions and supporting attributes, where each policy file is managed via the mobile application management server 12. Illustratively, the policies are defined by including a set of restrictions, e.g., actions are not allowed for the mobile application. These policies are then assigned to various instantiations of a mobile application that considers, amongst other criteria, the AppID, DeviceType, UserGroup and/or UserID, etc. In embodiments, the actions can include, amongst other examples:

1. Block access to certain device hardware elements (e.g., Camera, GPS, SMS, Phone, Data, etc.);
2. Block access to certain device hardware elements if the device is within a specified geo-boundary;
3. Block all network traffic if a VPN connection is active;
4. Require VPN connection to be active in order to use the mobile application;
5. Block access to the device camera if the device is within the defined geo-boundary(s) that designate corporate office locations;
6. Block the ability to store data on the device;
7. Block the ability to access the device's photo library;
8. Enforce application closure after a specific idle time has elapsed;
9. Require all outbound traffic travels over a secure connection such as using SSL;
10. Limit the IP addresses, domains and/or ports the application is allowed to connect to (firewall for applications);
11. Allow offline access;
12. Require the encryption of data stored or transferred;
13. Disable document sharing;
14. Disable cut, copy and/or paste operations;
15. Disable application after an expiration time;
16. Application usage only during a specific date or time span (e.g., business hours).

It should be understood by those of skill in the art, that the policies include a reusable library of application policy enforcements that can be combined with any enterprise mobile application. These libraries are transparent, thus allowing the developer to write code without any knowledge that the security libraries will be used to enforce policies. As the library of policies are transparent to the developer, they can be applied to applications after they are compiled. Also, in this way, the mobile applications can continue to use the full set of existing standard APIs of a current operating system.

Figure 2:
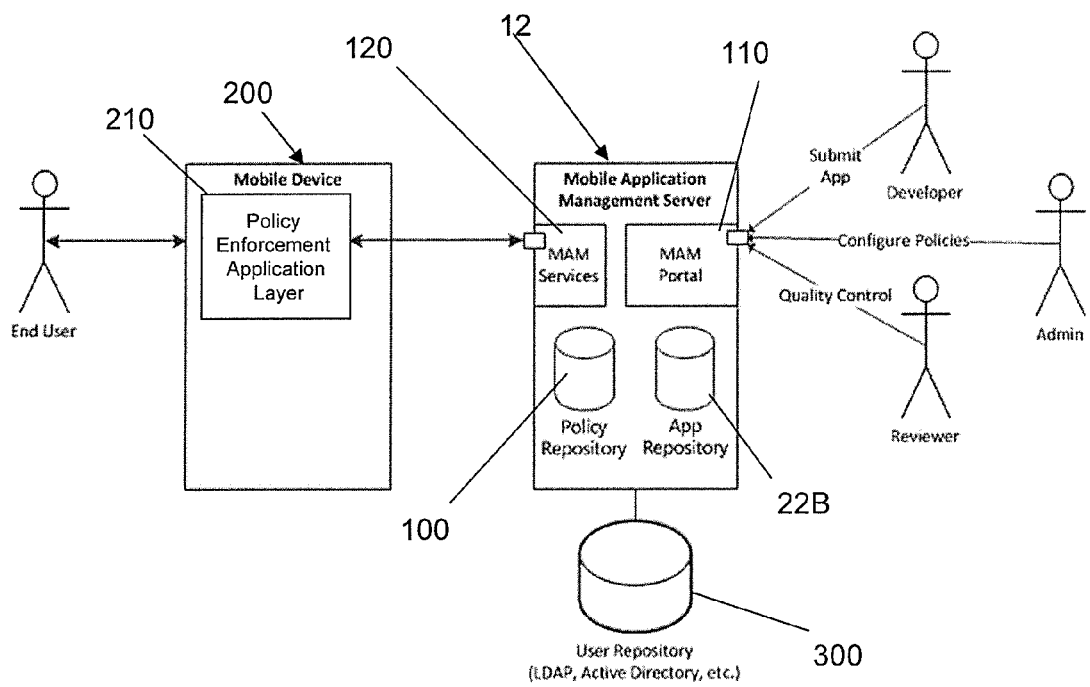
FIG. 2 shows a logical architecture overview of the system in accordance with aspects of the present invention.

FIG. 2 shows a logical architecture overview of the system in accordance with aspects of the present invention. Specifically, FIG. 2 shows further details of the mobile application management server 12 and mobile device 200. FIG. 2 also shows a user repository 300. The user repository 300 can include, for example, LDAP (Lightweight Directory Access Protocol), the user directories, etc.

In embodiments, a developer can independently develop a mobile application, without knowledge of the policies. This allows the developer more flexibility in creating the mobile application, without having to consider or be encumbered by the policies, which will be later developed and packaged with the mobile applications. The developer can upload the mobile application into the mobile application management server 12 (e.g., application store), via MAM portal 110. The mobile application can then be saved in the application repository 22B. The developer can be a third party developer, or an employee of the enterprise. In any scenario, though, the developer can be free to develop and desired mobile application, with its own policies, etc.

Moreover, an enterprise administrator or other authorized user can create, configure and/or update the policies (rules) and upload them to the mobile application management server 12, via the MAM portal 110. The policies can then be saved in the policy repository 100. In embodiments, the policies can be independently developed and later packaged with the mobile application. In this way, the administrator of the policies can create, update, etc. the policies, regardless of the specific mobile application, its content, its inherent policies or the underlying binary (code).

By way of example, in implementing the present invention, the administrator can merely create a line of code within the mobile application, i.e., decompile the mobile application, place a line of code within the binary, and recompile into executable program code. Thus, the library of policies can be added to an existing mobile application binary (code) at any time, which allows added flexibility in creating the policies. It should be understood that the policies can also be utilized during development of a mobile application. In embodiments, the policy can integrate to an external user repository for authenticating users to the MAM services and for selecting enterprise users and groups for targeting policies.

In embodiments, a default policy can initially be packaged with any of the mobile applications, and distributed to the mobile device 100, via the MAM services 120. The policy file can be provided in an XML file or other type of file, and will include restrictions to be enforced by the policy enforcement application layer 210 of the mobile device 200. The policy file can be stored in cache or other local storage system on the mobile device 200. This will allow the policy to run independent of the mobile application, and allows the policies to be called up for execution at either startup of the mobile device or of the specific mobile application. That is, once downloaded onto the mobile device, the policies simply act as a security layer between the application runtime code and the operating system of the mobile device. For example, at run time of the mobile device and/or mobile application, the mobile application will call up the policies which, in turn, can be run by the APIs of the operating system of the mobile device.

In further embodiments, an updated policy may be obtained through either a pull or push operation. For example, a default policy (or most recently updated policy) can specify that each time the mobile application starts it must check for an updated policy within the mobile application management server 12. In this case, the policy enforcement application layer 210 inside the mobile device (or called by the mobile application) connects to the mobile application management server 12 to check for an updated policy. If an updated policy is found, the local copy of the policy is updated on the mobile device 200. If an updated policy is found, but cannot be downloaded and updated locally, the policy may enforce a message to the user to install the latest version of the mobile application and block the mobile application from running. In alternative embodiments, the policy enforcement application layer 210 can continue functioning if the mobile application management server 12 cannot be reached during startup if the default policy or most updated policy allows for such action. In other embodiments, the existing local policy may only allow the mobile application to function for a limited time span before requiring communication with the mobile application management server 12.

Alternately, the policy enforcement application layer 210 could receive a push notification from the mobile application management server 12 to immediately update the policy. The push notification could include the updated policy information or it could simply cause the policy enforcement application layer 210 to retrieve the latest policy. In embodiments, the push notification could include instructions on what to do in the case of a policy retrieval failure. For example, the push notification would communicate one of the following actions on immediate policy update failure:

1. On failure, close application until new policy can be downloaded;
2. On failure, allow the application to continue execution for a predefined number days, e.g., 2 days; or
3. On failure, allow the application to continue indefinitely.

In either a push or pull scenario, the enterprise administrator can update or create new policies on the mobile application management server 12, at any time. The enterprise administrator can update or create these policies, independent and regardless of the specific mobile applications. These updated policies can not only change the rules, but how and when they are applied to a mobile application based on many different factors. For example, the rules can be changed based on company or enterprise policies, e.g., a president of the company can have access to all device hardware and functions while running the mobile application, and may gain access to the mobile application through any mobile device. This can be achieved by noting the userID and password, at startup or authentication.

Still referring to FIG. 2, the systems and processes of the present invention also have the ability to protect a lost or stolen mobile device. For example, in the event a device is lost or stolen, the mobile application management server 12 would be updated with the userID and/or DeviceID of the lost/stolen device. This would generate a unique policy for that userID and/or DeviceID to wipe and lock each mobile application that contains the policy enforcement application layer 210. In more specific embodiments, the mobile application management server 12 can maintain a list of every installed application on each individual mobile device, so the lost or stolen device would include a the wipe and lock policy for every registered mobile application.

In more specific embodiments, a push notification would be sent to the device to ensure the update is taken immediately. If push notifications were disabled on the mobile device, the mobile application would then receive the updated policy at each application startup, at which time the mobile device would initiate the wipe and lock policy for the individual application. This would also be useful when users end employment with the company, or under other circumstances.

FIG. 2 further shows a reviewer which provides quality control. For example, the reviewer can ensure that the mobile applications are appropriate and function properly. Also, the reviewer can also ensure that the policies are accurately matched to the application, user, mobile device, etc.

Figure 3:
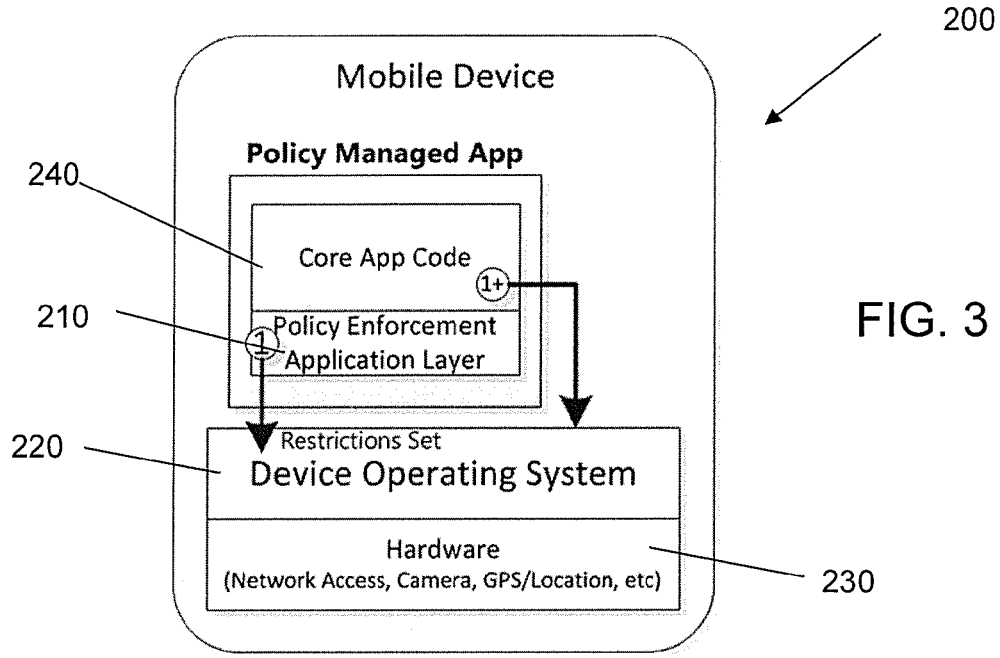
FIG. 3 shows an implementation within a mobile device in accordance with aspects of the present invention.

FIG. 3 shows a first implementation within a mobile device in accordance with aspects of the present invention. As shown in FIG. 3, the mobile device 200 includes the policy enforcement application layer 210, a device operating system 220, appropriate hardware/software 230 and the core application code (e.g., mobile application) 240. In this approach, the enforcement policies remain resident on the mobile device 200, and more specifically in the policy enforcement application layer 210. In this way, the policy enforcement mechanism does not require any external network infrastructure to enable the solution, once it is installed or updated on the mobile device 200. Instead, the policy file, i.e., preferably the most recently updated policy file, is kept locally on the mobile device 200, and will run through the operating system 220 of the mobile device 200 without the need for any external, remote server resources or custom APIs.

More specifically, in the approach of FIG. 3, to enforce the policies, the policy is processed each time the application is started, i.e., "startup configuration enforcement". For example, in this approach, the policy enforcement application layer 210 calls specific operating system APIs to set the required restrictions for the application session. That is, the policies resident in the policy enforcement application layer 210 are sent to the operating system 220 for enforcement, on start-up. Control is then turned over to the mobile application 240 to interact directly with the APIs of the operation system 220. In this scenario, the operation system 220 is made aware of the restrictions and will not execute any application command that violates the restrictions communicated by the policy enforcement application layer 210.

Figure 4:
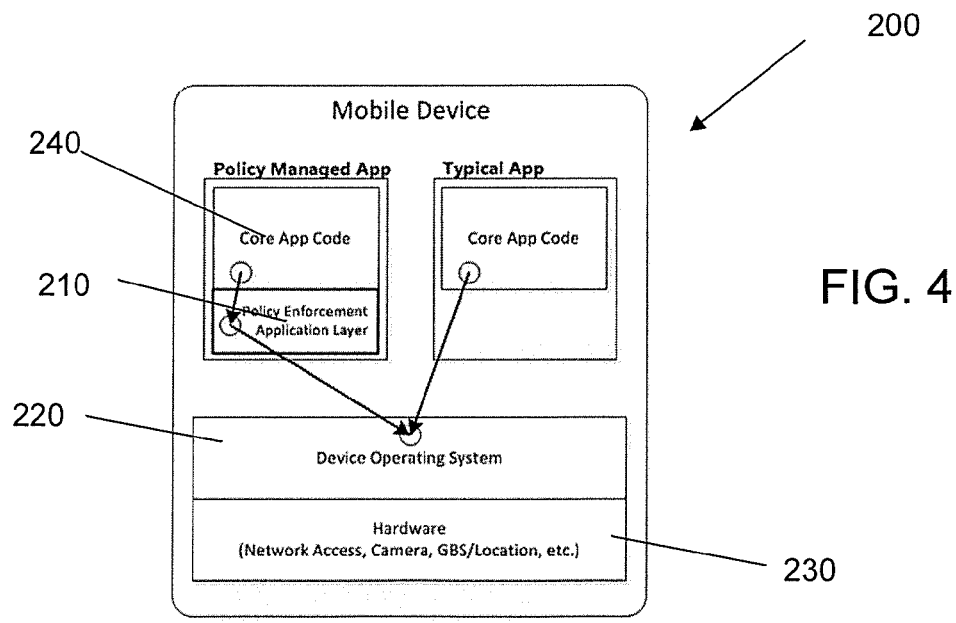
FIG. 4 shows another implementation within a mobile device in accordance with aspects of the present invention.

FIG. 4 shows another implementation within a mobile device in accordance with aspects of the present invention. Similar to FIG. 3, the mobile device 200 includes the policy enforcement application layer 210, a device operating system 220, appropriate hardware/software 230 and the core application code 240. Much like the approach in FIG. 3, in this approach, the enforcement policies also remain resident on the mobile device 200, and more specifically in the policy enforcement application layer 210. In this way, the policy enforcement mechanism does not require any external network infrastructure to enable the solution, once it is installed or updated on the mobile device 200.

In the approach of FIG. 4, all API calls from the native application (e.g., mobile application) 240 will pass through the policy enforcement application layer 210 before reaching the native operating system 220. In this implementation, the enforcement application layer 210 will validate if the API call is allowed and either pass it to the operating system 220 or block it from the operating system 220. Thus, the enforcement application layer 210 will control the policies during run time. In the case that the polices are valid, they will then be enforced during run time of the mobile application. In either approach, there is no need for any custom APIs, for implementing of the policies.

Figure 5:
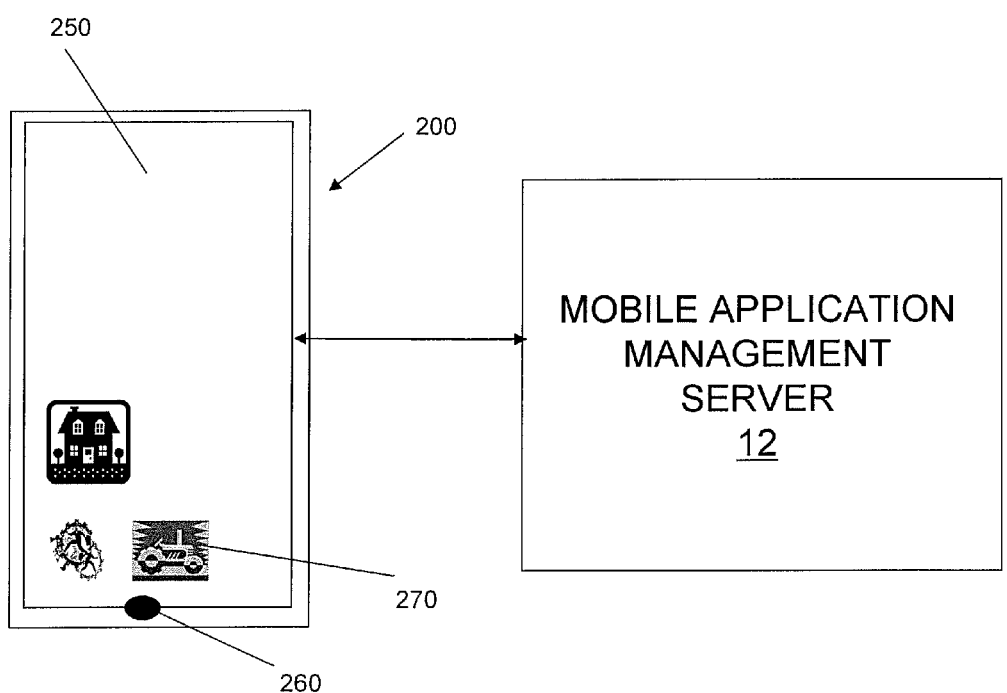
FIG. 5 shows a registration process in accordance with aspects of the present invention.

FIG. 5 shows a registration process in accordance with aspects of the present invention. More specifically, FIG. 5 shows a registration process between the mobile device 200 and the mobile application management server 12. As shown in FIG. 5, the mobile device 200 includes an interface 250, controls 260 and a plurality of icons 270. As should be understood by those of skill in the art, any of the icons 270 can be representative of a mobile application, in accordance with aspects of the present invention.

In embodiments, the mobile device 200 can register itself with the mobile application management server 12 by providing certain information to the mobile application management server 12. For example, the mobile devices 200 can provide its MAC address and/or other device identification. In this way, the mobile application management server 12 can authenticate the mobile device 200 at start up during subsequent sessions, such that updated policies can be installed specific to the mobile device 200.

Flow Diagram

Figure 6:
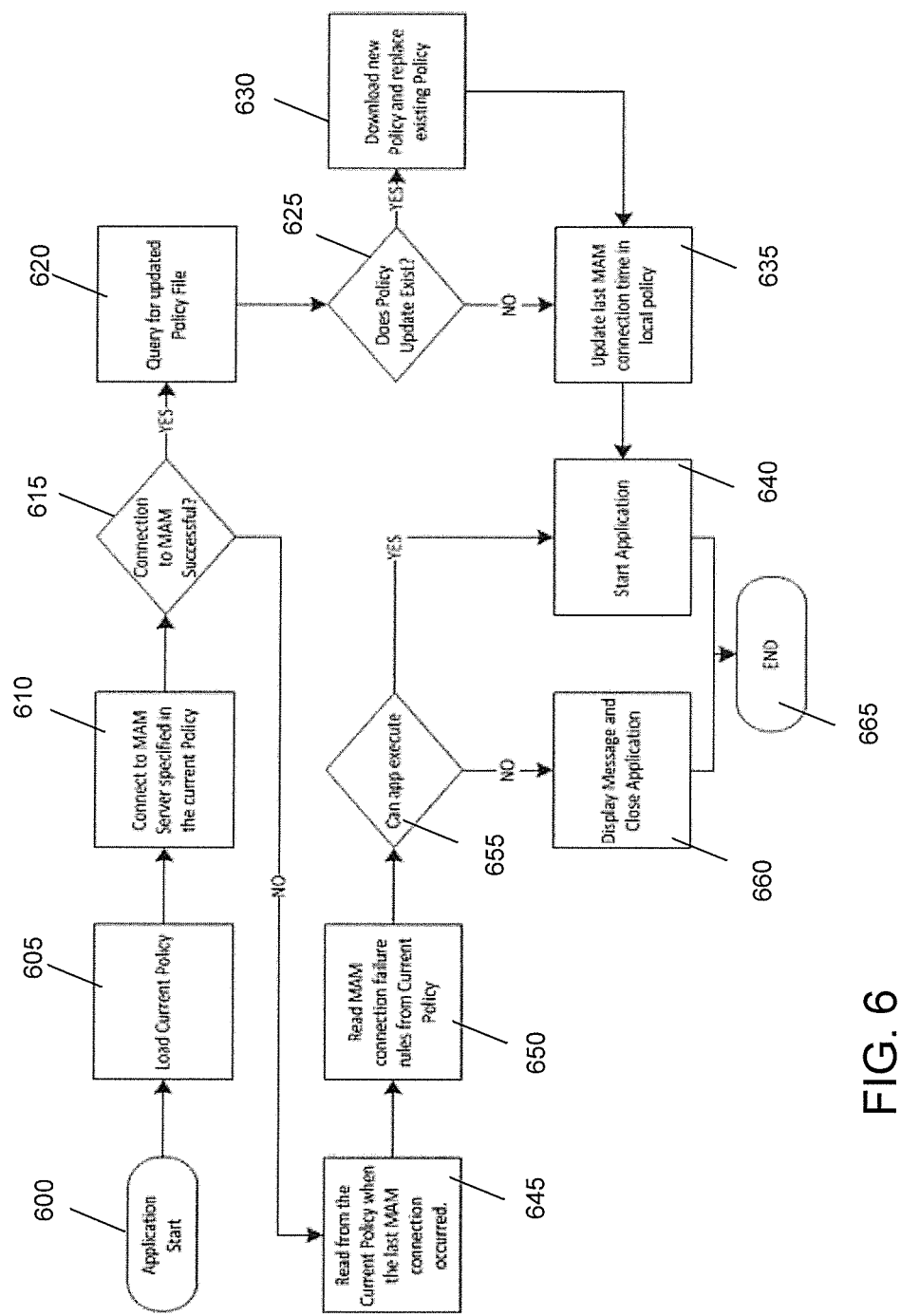
FIG. 6 shows a flow diagram implementing processes in accordance with aspects of the invention.

FIG. 6 shows a flow diagram implementing aspects of the present invention. The flow diagram may equally represent a high-level block diagram or a swim-lane diagram of the invention. The steps of the flow diagram may be implemented and executed from either a server, in a client server relationship, or they may run on a user workstation with operative information conveyed to the user workstation. Furthermore, the invention can take the form of a computer program product accessible from a computer-readable storage medium providing program code for use by or in connection with a computer or any instruction execution system. The software and/or computer program product can be implemented in the environment of FIGS. 1-5.

In FIG. 6, at step 600, the application starts. At step 605, the mobile device can load the current policy into its operating system. At step 610, the mobile device connects to the mobile application management server specified in the current policy. At step 615, a determination is made as to whether the connection was successful. If so, at step 620, a query is made for an updated policy (pull approach). At step 625, a determination is made as to whether a policy update exists. If the policy update exists, at step 630, the policy is updated and/or replaced with a new policy, now stored locally in the mobile device. At step 635, the last connection time to the server is recorded in the local policy. This will allow the mobile device to determine when a new update should be requested, for example. At step 640, the mobile application can start, using the updated policy. If at step 625 it is determined that there is no updated policy, the process continues directly to step 635.

If, at step 615, a connection was not successful, the processes will continue to step 645. At step 645, the mobile device will read the current, local policy, and determine when the last connection to the server was made. At step 650, the mobile device will read the connection failure rules from the most recent policy, residing on the mobile device. At step 655, a determination will be made as to whether the mobile application can be executed. If not, at step 660, a message will be displayed, indicating that the mobile application cannot be executed, and the application will close. Of course, other actions can also be taken, depending on the current policy. If the mobile application can be executed as determined at step 660, the mobile application will start at step 640. The process ends at step 665.

The flow of FIG. 6 can also support the sending of user profile information and or device information with the request for an updated policy. Examples of user profile information may include information such as individual user id, group membership and/or role information. Device information may include a unique deviceID, the OS version of the device, and/or device characteristics such as storage. It could also include the results of any security checks such as checking if the device is "jailbroken" or "rooted." In this case, the mobile application management server 12 would respond with different versions of the policy based on the specific of the user and the device. Also, the flow of FIG. 6 can easily be adapted to a push application, by simply pushing the policy to the mobile application at start-up, e.g., step 620.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method comprising:
    storing independently developed mobile applications on at least one server;
    storing independently developed policies on the at least one server, wherein the independently developed policies are developed independent of content of the independently developed mobile applications, such that the independently developed mobile applications are developed without knowledge of the independently developed policies, and each independently developed policy includes a reusable library of application policy enforcements that are combinable with each of the independently developed mobile applications;
    associating a policy of the stored independently developed policies with any of the mobile applications of the independently developed mobile applications; and providing the associated policy and mobile application to a mobile device.

2. The method of claim 1, wherein:
the independently developed policies combined with any enterprise mobile application of the independently developed mobile applications, and
the independently developed mobile applications continue to use existing application program interfaces (API) of an operating system of the mobile device.

3. The method of claim 2, wherein:
the independently developed policies are a security layer between runtime code of the independently developed mobile applications and the operating system of the mobile device; and
the policy runs on the API of the operating system of the mobile device and independent of the mobile application.

4. The method of claim 3, wherein the policy running on the API of the operating system of the mobile device provides instructions to the operating system, prior to running the associated mobile application.

5. The method of claim 2, wherein:
the policy is updated at run time of the mobile application; and
the policy is updated by one of a pull operation and push operation from the at least one server and is combined with any of the independently developed mobile applications based on predetermined factors.

6. The method of claim 5, wherein the predetermined factors include at least one of application ID, device platform, specific DeviceID, specific userid, device characteristics and user group information.

7. The method of claim 2, further comprising:
receiving a query for an updated policy;
determining that the updated policy exists; and
providing the updated policy to the mobile device.

8. The method of claim 7, further providing a time stamp of a last update of the policy.

9. The method of claim 1, further comprising providing a unique policy for a userID and/or DeviceID to wipe and lock each mobile application that contains the unique policy.

10. A computer program product comprising computer readable program instructions stored on a non-transitory computer readable storage medium, the computer readable program instructions causing a computing device to:
retrieve independently developed mobile applications, which run on existing APIs of a mobile device;
retrieve one or more independently developed policies, which run through existing APIs of an operating system of the mobile device, wherein the independently developed policies are developed independent of content of the independently developed mobile applications and each independently developed policy includes a reusable library of application policy enforcements that are combinable with each of the independently developed mobile applications; and
provide a policy of the one or more independently developed policies and a mobile application to be independently executed on a mobile device, by having the policy run on the existing API of the operating system of the mobile device and independent of the mobile application, wherein the policy defines restrictions of application commands that are enforced while the mobile application is running on the mobile device,
wherein one of: (i) each time the mobile application is started on the mobile device, the application policy enforcements of the policy are configured to be sent to specific APIs of the existing APIs of the operating system to set the restrictions for an application session, and (ii) while the mobile application is running on the mobile device, the application policy enforcements of the policy are configured to validate each API call from the mobile application to the operating system based on the restrictions.

11. A system implementing policies on a mobile device and associated with at least one mobile application, comprising:
a mobile application management server, comprising:
a portal for receiving independently developed mobile applications and one or more policies;
a repository for storing the independently developed mobile applications;
a repository for storing the one or more policies, wherein the one or more policies are developed independent of content of the independently developed mobile applications, such that the independently developed mobile applications are developed without knowledge of the independently developed polices, and each policy includes a reusable library of application policy enforcements that are combinable with each of the independently developed mobile applications; and
a service component to provide a policy of the stored policies and an associated mobile application of the mobile applications to a mobile device.

12. The system of claim 11, wherein the mobile application management server updates the policy and any subsequent updated policies by one of a pull operation and push operation at run time of the mobile application.

13. The system of claim 11, further comprising a component operable to:
receive a query for an updated policy;
determine that the updated policy exists;
block the mobile application from running on the mobile device based on the updated policy having not been downloaded and updated locally on the mobile device.

14. The system of claim 13, wherein the updated policy is based on at least one of application ID, device platform, specific DeviceID, specific userid, device characteristics and user group information.

15. The system of claim 11, wherein the mobile application management server provides a unique policy for at least one of a userID and DeviceID to wipe and lock each mobile application that contains the unique policy.

16. The system of claim 11, wherein:
the one or more policies combined with any enterprise mobile application of the independently developed mobile applications; and
the policy is appended to the mobile application such that both the policy and the mobile application are downloaded to the mobile device as combined components.

17. The system of claim 16, wherein:
the one or more policies are provided in a policy enforcement layer between an operating system of the mobile device and the independently developed mobile applications; and
the policy enforcement layer runs on an application program interface of the mobile device and independent of the mobile application.

18. The system of claim 11, wherein the mobile application management server is a computer infrastructure having computer executable code tangibly embodied on a computer readable storage medium having programming instructions.

19. A computer system for sending and receiving policies and mobile applications, the system comprising:

a CPU, a computer readable memory and a computer readable storage media;

first program instructions to retrieve independently developed mobile applications, which run on existing APIs of a mobile device;

second program instructions to retrieve one or more independently developed policies, which run through existing APIs of an operating system of the mobile device, wherein the one or more independently developed policies are created and updated regardless of content and underlying binary code of the independently developed mobile applications and each policy includes a reusable library of application policy enforcements that are combinable with each of the independently developed mobile applications; and third program instructions to provide a policy of the one or more independently developed policies and a mobile application to be independently executed on a mobile device, by having the policy run on the existing API of the operating system of the mobile device and independent of the mobile application, wherein the policy defines restrictions of application commands that are enforced while the mobile application is running on the mobile device, wherein the first, second and third program instructions are stored on the computer readable storage media for execution by the CPU via the computer readable memory.

20. The computer system of claim 19, further comprising fourth program instructions to send a push notification to update the policy to the mobile device, wherein the push notification, based on a failure to immediately update the policy, closes the mobile application until the policy is updated.

21. The computer system of claim 19, further comprising fourth program instructions to wipe and lock a mobile application residing on the mobile device.

22. The computer system of claim 19, further comprising fourth program instructions to receive a request for an updated policy, determine there is an updated policy for the mobile application or the mobile device and sending the updated policy to the mobile device.

23. The computer system of claim 19, further comprising fourth program instructions to request an updated policy, receive the updated policy from a server and execute the updated policy on the mobile device.

24. The computer system of claim 19, wherein:

the independently developed policies combined with any enterprise mobile application of the independently developed mobile applications;

the independently developed policies provide a policy enforcement application layer between the operating system of the mobile device and the independently developed mobile applications when running on the mobile device;

the policy runs on the API of an operating system of the mobile device and independent of the mobile application; and one of: (i) while the mobile application is running on the mobile device, the operating system will not execute any application command that violates a restriction communicated by the policy enforcement application layer, and (ii) while the mobile application is running on the mobile device, the policy enforcement application layer validates an API call from the mobile application and passes valid API calls to the operating system and blocks invalid API calls.

25. A method, comprising:

receiving and storing a mobile application at a mobile device;

receiving and storing a policy at the mobile device, wherein the policy is associated with the mobile application; and executing the policy through an application program interface (API) of an operating system of the mobile application, prior to the mobile application, wherein:

the mobile application is received from a mobile application management server comprising a plurality of mobile applications;

the policy is developed independent of content of the mobile application and is received from a reusable library of application policy enforcements that are combinable with each of the plurality of mobile applications including the received mobile application;

the policy provides a security layer between the mobile application and an operating system of the mobile device;

the policy runs independent of the mobile application;

the policy runs through the operating system of the mobile device, prior to the mobile application, to apply enforcement rules for the mobile application; and the executing the policy comprises running the policy on the mobile device without connection to a policy resource that is external to the mobile device.

* * * * *